(No Model.)
I. M. JACOBS.
STOVE LID LIFTER.
No. 302,494. Patented July 22, 1884.
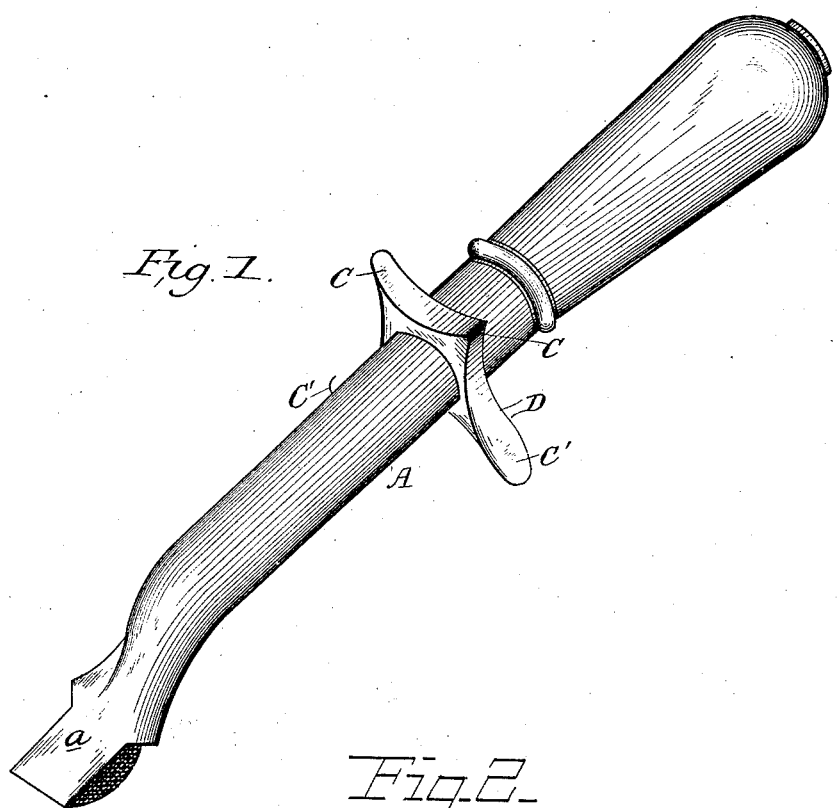
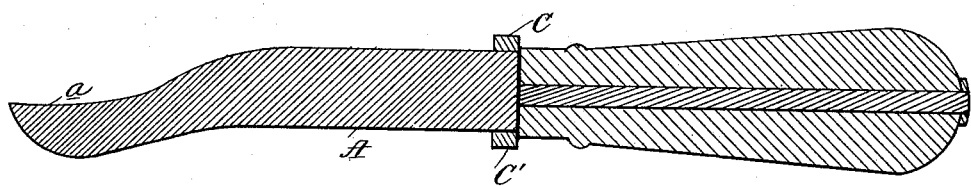
WITNESSES
I. M. Jacobs
INVENTOR
Attorneys

UNITED STATES PATENT OFFICE.

IRVIN M. JACOBS, OF EAST GREENVILLE, PENNSYLVANIA.

STOVE-LID LIFTER.

SPECIFICATION forming part of Letters Patent No. 302,494, dated July 22, 1884.

Application filed August 27, 1883. (No model.)

*To all whom it may concern:*

Be it known that I, IRVIN M. JACOBS, of East Greenville, in the county of Montgomery and State of Pennsylvania, United States of America, have invented certain new and useful Improvements in Stove-Lid Lifters, of which the following is a specification.

This invention relates to that class of devices adapted to lift the lids or covers of stoves; and it has for its object to improve the construction of the same in such a manner as to make them more convenient and safe to handle.

Heretofore stove-lid lifters have been constructed entirely of cast-iron in different shapes, and this construction has proven disadvantageous, for the reason that the handle end of the lifter becomes heated while in operation, causing it to be unsafe to touch. They have also been constructed with wooden handles; but no provision has heretofore been made for raising the handle above the stove while being used. This is the special object of my invention; and to attain this end it consists in providing the shank or stem of the lifter with a collar having a series of projections adapted to bear against the stove while raising the lid or cover, and thus hold the handle from contact with the stove and preventing the hands of the operator from being burned or soiled.

It consists, further, in details of construction and combination of parts, as hereinafter set forth, and particularly pointed out in the claims.

In the accompanying drawings, Figure 1 is a perspective view of my improved lifter. Fig. 2 is a longitudinal sectional view of the same.

Referring to the drawings, A designates the stem or shank of the lifter, provided with the usual toe, *a*, at one end, and a wooden handle, B, at the other end, the handle being secured to the tang of the shank in any suitable manner.

D designates a collar secured to the shank at the junction with the handle, and provided with a series of radial projections, C C', the lower projections, C', flaring outwardly, so as to provide a rest for the lifter when applied to a stove, and the space between the upper projections, C, providing room for the thumb of the operator, as desired. The said projections C C' extend outward from the collar in different directions, and may be of any desirable number; but I prefer the arrangement shown, since it is the most convenient and desirable that could be adopted.

In constructing my improved lifter, the collar is inserted in place on the end of the shank while hot, and becomes fast when the casting is cool. The handle is then placed over the tang of the shank, and a ring, *m*, riveted on the end of the handle, so as to secure the same firmly in place. Thus the toe, shank, and collar are practically formed in one piece, and since the collar is not cast with the shank there will be less liability of its being broken while in use.

The operation of my invention will be readily understood from the foregoing description, taken in connection with the annexed drawings. The lifter is applied to the stove in the usual manner, the hand of the operator grasping the wooden handle, the lower projections, C', resting upon the stove, thereby raising the handle from contact with the stove, and preventing the hand of the operator from being burned or soiled.

By the construction shown the handle is raised a sufficient height from the stove, so as to avoid soiling or burning the hands of the operator. The handle of the lifter will not become heated, but will remain cold, so as to be easy and safe to handle. Other advantages are attained by the use of my invention, and it will be seen that it forms a safe, simple, durable, and efficient device, which can be manufactured cheaply, and which will prove of great utility.

In order that the advantages and scope of my invention may be apparent to those skilled in the art to which this invention appertains, I would have it understood that I do not claim the construction shown in the patent to Murphy, No. 116,739, dated July 4, 1871, in which a circular collar is shown attached to the handle of a griddle-lifter, to shield the hand from the heat of the stove when the lifter is in use. I therefore do not claim, broadly, a collar attached to the handle, as such does not effect the object of my invention; but the series of projections formed on the collar and projecting radially outward, the lower series flaring outward to provide a rest against the stove, so as to raise the wooden handle above the same, is a new feature. Furthermore, the collar shown in the Murphy patent is formed of sheet metal attached to the handle, and will soon become loose by the constant heat from the stove, while my collar is secured in place in such a manner that it will not break, since it is not cast with the shank, and will not become loose.

Having described my invention, I claim—

1. In a stove-lid lifter, the stem or shank having a collar secured thereon, said collar having a series of radial projections, the lower series flaring outwardly, so as to form a rest, as set forth.

2. In a stove-lid lifter, the stem or shank having a collar secured thereon at the junction with the handle, said collar having four projections extending radially outward, for the purpose set forth.

3. In a stove-lid lifter, the stem or shank having a collar secured thereto, said collar having a series of radial projections, the lower series flaring outwardly, so as to form a rest, and the upper series providing room for the thumb, as set forth.

IRVIN M. JACOBS.

Witnesses:
 JOHN N. JACOBS,
 WILLIAM M. JACOBS.